United States Patent
Schenk et al.

(10) Patent No.: US 12,334,859 B2
(45) Date of Patent: Jun. 17, 2025

(54) GAS-TURBINE ELECTRICAL START SYSTEM

(71) Applicants: Rolls-Royce North American Technologies, Inc., Indianapolis, IN (US); Rolls-Royce Corporation, Indianapolis, IN (US)

(72) Inventors: Peter Schenk, Indianapolis, IN (US); Erik A. Munevar, Indianapolis, IN (US); Rigoberto J. Rodriguez, Indianapolis, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 83 days.

(21) Appl. No.: 17/819,527

(22) Filed: Aug. 12, 2022

(65) Prior Publication Data

US 2024/0056007 A1  Feb. 15, 2024

(51) Int. Cl.
*H02P 9/08* (2006.01)
*F02C 7/268* (2006.01)
*H02P 101/25* (2016.01)
*H02P 101/30* (2015.01)

(52) U.S. Cl.
CPC ............. *H02P 9/08* (2013.01); *F02C 7/268* (2013.01); *H02P 2101/25* (2015.01); *H02P 2101/30* (2015.01)

(58) Field of Classification Search
CPC .... H02P 9/08; H02P 2101/25; H02P 2101/30; F02C 7/268
See application file for complete search history.

(56) References Cited

U.S. PATENT DOCUMENTS

| 8,066,226 | B2 | 12/2011 | Fiala et al. |
| 9,540,998 | B2 | 1/2017 | Schlak |
| 9,777,698 | B2 | 10/2017 | Schlak |

(Continued)

FOREIGN PATENT DOCUMENTS

| EP | 2227342 A1 | 9/2010 |
| EP | 2384397 A2 | 11/2011 |

(Continued)

OTHER PUBLICATIONS

Bailey et al., "Why Embraer Decided to Invest in a New Turboprop Aircraft", Simply Flying, Sep. 24, 2021, 1 pp., https://simpleflying.com/why-embraer-decided-to-invest-in-a-new-turboprop-aircraft/.

(Continued)

*Primary Examiner* — Sean Gugger
(74) *Attorney, Agent, or Firm* — Shumaker & Sieffert, P.A.

(57) ABSTRACT

An example system includes a power electronics system; a starter electrically connected to the power electronics system and configured to start a gas-turbine engine of an aircraft; and an energy storage system electrically connected to the power electronics system and configured to provide direct current (DC) electrical energy to the power electronics system, wherein the power electronics system is configured to deliver alternating current (AC) electrical energy to the starter to start the gas-turbine engine using the DC electrical energy from the energy storage system and AC electrical energy sourced from an AC electrical bus of the aircraft.

20 Claims, 10 Drawing Sheets

(56) References Cited

U.S. PATENT DOCUMENTS

| | | |
|---|---|---|
| 10,253,687 B2 | 4/2019 | Jones et al. |
| 10,261,229 B2 | 4/2019 | Woelfing et al. |
| 10,443,504 B2 | 10/2019 | Dalal |
| 10,476,362 B2 | 11/2019 | Hunstable |
| 10,676,199 B2 | 6/2020 | Hon et al. |
| 11,007,955 B2 | 5/2021 | Klemen et al. |
| 11,014,513 B2 | 5/2021 | Klemen et al. |
| 11,078,850 B2 | 8/2021 | Dalal |
| 11,130,456 B2 | 9/2021 | Klemen et al. |
| 11,277,062 B2 | 3/2022 | Hunstable |
| 11,427,340 B2 | 8/2022 | Hon et al. |
| 2004/0119454 A1* | 6/2004 | Chang .............. H02M 5/272 323/284 |
| 2012/0133152 A1* | 5/2012 | Wagoner ............. F03D 80/82 290/1 B |
| 2016/0023773 A1 | 1/2016 | Himmelmann et al. |
| 2016/0208709 A1* | 7/2016 | Huang .................. F02C 7/26 |
| 2017/0335713 A1 | 11/2017 | Klemen et al. |
| 2017/0335795 A1 | 11/2017 | Klemen et al. |
| 2018/0112599 A1* | 4/2018 | Dalal .................. F02C 7/268 |
| 2018/0354632 A1 | 12/2018 | Hon et al. |
| 2019/0002113 A1 | 1/2019 | Gansler et al. |
| 2019/0003398 A1 | 1/2019 | Gibson et al. |
| 2020/0412160 A1* | 12/2020 | Manzoor ............. B60L 50/60 |
| 2021/0222629 A1 | 7/2021 | Terwilliger |
| 2022/0396365 A1 | 12/2022 | Muldoon et al. |
| 2023/0034316 A1 | 2/2023 | Weekes |
| 2023/0182918 A1 | 6/2023 | Moore et al. |
| 2023/0182920 A1 | 6/2023 | Moore et al. |
| 2024/0243632 A1 | 7/2024 | Tanner |

FOREIGN PATENT DOCUMENTS

| | | |
|---|---|---|
| EP | 2801719 A1 | 11/2014 |
| EP | 3337967 A1 | 6/2018 |
| WO | 2009077771 A1 | 6/2009 |
| WO | 2017029437 A1 | 2/2017 |
| WO | 2017066223 A1 | 4/2017 |

OTHER PUBLICATIONS

U.S. Appl. No. 17/562,540, filed Dec. 27, 2021, naming inventors Morgan et al.

U.S. Appl. No. 17/819,509, filed Aug. 12, 2022, naming inventors Schenk et al.

Harrington, "Turbine Generator", Science Dirrect, ScienceDirect, Dec. 17, 2022, 16 pp.

Office Action from U.S. Appl. No. 17/819,509 dated Sep. 16, 2024, 13 pp.

Notice of Allowance from U.S. Appl. No. 17/819,509 dated Jan. 3, 2025, 8 pp.

Response to Office Action dated Sep. 16, 2024 from U.S. Appl. No. 17/819,509, filed Dec. 5, 2024, 11 pp.

* cited by examiner

GAS-TURBINE ELECTRICAL START SYSTEM

TECHNICAL FIELD

The present disclosure relates to gas-turbine engine systems that are used, in some examples, for powered vehicles, such as aircraft.

BACKGROUND

A gas-turbine engine is a type of internal combustion engine that may be used to power an aircraft, or another moving vehicle. The turbine in a gas-turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive a propulsor, and the propulsor may use the energy from the rotating shaft to provide propulsion for the system.

Gas-turbine engine powered vehicles, such as aircraft, increasingly use electrical systems which may operate to provide auxiliary functions beyond vehicle propulsion. Electrical systems may be used to replace mechanical, hydraulic, and pneumatic drive systems in gas-turbine engine powered vehicles. Gas-turbine engine powered vehicles may include electrical energy generating systems to supply power for the electrical systems.

SUMMARY

In general, this disclosure describes techniques and associated systems that promote even heat dissipation in gas-turbine engines. When a gas-turbine is shut off, various components of the gas-turbine engine may retain heat that resulted from operation of the gas-turbine engine. As the components cool, the components may slightly change size. For certain components, such as rotors or other components with tight clearances, uneven cooling may be undesirable. For instance, uneven cooling may result in the components seizing, which may frustrate re-start of the gas-turbine engine until additional cooling has occurred.

In accordance with one or more aspects of this disclosure, an electric motor may rotate one or more components of a gas-turbine engine after the gas-turbine engine has been shut off. For instance, the electric motor may spin, using electrical energy sourced from one or more batteries, a rotor of the gas-turbine engine after the gas-turbine engine has been shut off. Spinning of the rotor may promote more even cooling of the rotor, which may prevent undesirable seizing. The powered rotation of the rotor upon engine being shut off may be called barring. In this way, this disclosure may improve operation of the gas-turbine engine (e.g., by enabling re-start of the gas-turbine engine without having to wait for additional cooling).

In general, this disclosure describes techniques and associated system to restart gas-turbine engines. As engines have become more fuel-efficient engines, the overall pressure ratio on a compressor may be increased, with most or all of this compression being on a single shaft. This may lead to higher required starting torques in which windmilling energy may no longer be sufficient to restart the gas-turbine engines inflight, which may lead to undesirable consequences (e.g., if a gas-turbine engine cannot be re-started inflight).

In accordance with one or more aspects of this disclosure, an electrical starting system may provide supplemental assistance that may be required to restart the gas-turbine engines inflight. For instance, electrical energy from the energy storage system may be combined with electrical energy from an electrical machine, that may be powered by a propulsion system, to power one or more starters during an inflight restart to restart one or more of the gas-turbine engines. Accordingly, this disclosure may help provide sufficient power to restart one or more gas-turbine engines inflight.

In some examples, this disclosure describes a system system comprising: an electrical machine electrically configured to generate electrical energy used by one or more components of a gas-turbine engine; an energy storage system; and a controller electrically connected to the energy storage system and configured to receive electrical energy from the energy storage system, wherein, in response to the gas-turbine engine being shut off, the controller is configured to cause the electrical machine to rotate a rotor of the gas-turbine engine using the energy received from the energy storage system.

In some examples, this disclosure describes a method comprising detecting, by a controller, shut down of a gas-turbine engine of an aircraft; and responsive to detecting the shut down of the gas-turbine engine, causing, by the controller, an electrical machine to rotate a rotor of the gas-turbine engine using electrical energy sourced from an electrical energy storage system of the aircraft.

In some examples, this disclosure describes a system comprising: a power electronics system; a starter electrically connected to the power electronics system and configured to start a gas-turbine engine of an aircraft; and an energy storage system electrically connected to the power electronics system and configured to provide direct current (DC) electrical energy to the power electronics system, wherein the power electronics system is configured to deliver alternating current (AC) electrical energy to the starter to start the gas-turbine engine using the DC electrical energy from the energy storage system and AC electrical energy sourced from an AC electrical bus of the aircraft.

In some examples, this disclosure describes a method comprising receiving, by a power electronics system of an aircraft; direct current (DC) electrical energy from an energy storage system of the aircraft; receiving, by the power electronics system, alternating current (AC) electrical energy from an AC electrical bus of the aircraft; generating, by the power electronics system and from the DC electrical energy received from the energy storage system and the AC electrical energy received from the AC electrical bus, combined AC electrical energy; outputting, by the power electronics system and to a starter of a gas-turbine engine of the aircraft, the combined AC electrical energy; and starting, by the starter and using the combined AC electrical energy, the gas-turbine engine.

The details of one or more examples are set forth in the accompanying drawings and the description below. Other features, objects, and advantages will be apparent from the description and drawings, and from the claims.

DETAILED DESCRIPTION

Figure 1:
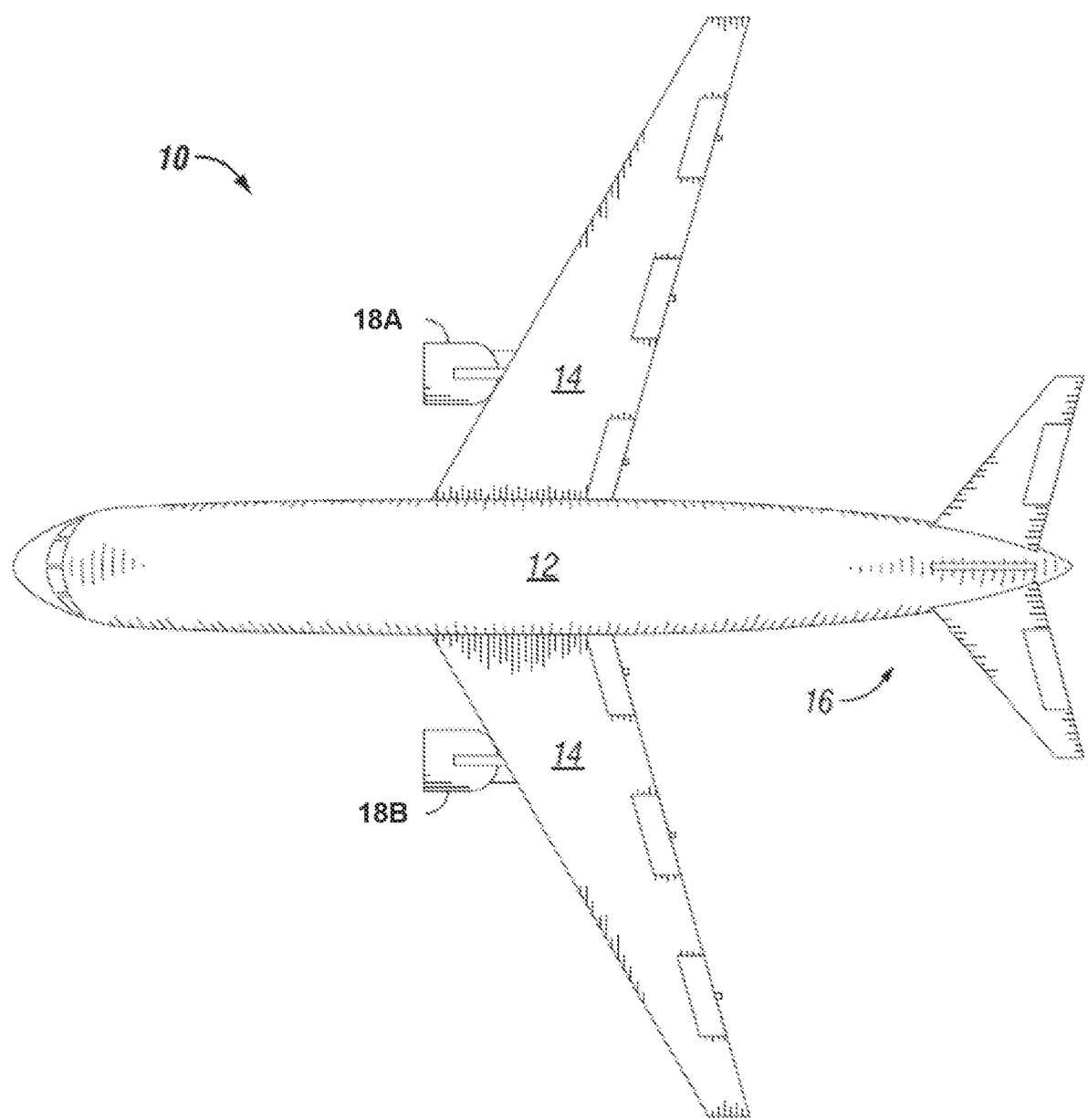
FIG. 1 is a conceptual diagram illustrating an example vehicle in accordance with an example of the present disclosure.

The present disclosure is directed to gas-turbine engine systems, e.g., for gas-turbine engine powered vehicles such an aircraft, and techniques for operating the same. For ease of description, examples of the disclosure will be primarily described in the context of aircraft as a gas-turbine engine powered vehicle. However, examples of the disclosure are not limited to aircraft. For instance, aspects of this disclosure may be applicable to gas-turbine powered ground vehicles, watercraft, and the like.

Aircraft increasingly require significant amounts of additional electrical power. For instance, in bleedless aircraft, various systems traditionally operated using bleed air (e.g., de-icing, cabin pressurization, engine start) may be replaced with electrically operated versions. Those electrical systems may increase the electrical load requirements for the vehicle.

Electrical machines that function as electric generators may be employed by gas-turbine combustion engine power aircraft to satisfy the transient and/or continuous electrical loads associated with the electrical system(s). For example, a gas-turbine engine having a low-pressure spool assembly (e.g., including a low-pressure (LP) compressor and/or propulsor and a low-pressure turbine connected by a low-pressure shaft) and high-pressure (HP) spool assembly (e.g., including a HP pressure compressor and a HP turbine connected by a HP shaft) may include an electric generator that generates electricity from the rotation of the LP spool shaft and/or the HP spool shaft. The electrical power extracted from the LP spool shaft and/or the HP spool shaft may be used to supply power to various aircraft systems (e.g., electrical systems of the vehicle system that require electrical energy to operate, such as aircraft anti-ice heating, weapon systems, navigation systems including radar, environmental cooling systems (ECS)).

Examples of the gas-turbine engine systems may include a high-pressure (HP) spool assembly and at least one other lower pressure (LP) spool assembly (e.g., a low-pressure spool assembly and/or an intermediate pressure spool assembly). The gas-turbine engine may include a generator coupled to the LP shaft of the LP spool assembly so that the generator generates power from the rotation of the LP shaft.

In some examples of the gas-turbine engine system, a gas-turbine engine may not include a center sump (e.g., in an effort to increase efficiency, improve secondary flow and reduce weight of the gas-turbine engine system). However, when the gas-turbine engine is shut off, the heat produced by the gas-turbine engine may warp a rotor of the gas-turbine engine such that the rotor may contact a compressor of the engine and/or lock-up inside a compressor of the engine. In addition, uneven heating may cause the tight clearances between shafts and top clearances on airfoils to close. When a rotor becomes locked-up, it may take prolonged time at rest to cool the rotor sufficiently to allow for clearance to be restored.

In some cases, rotor warping may be mitigated by removing heat from the gas-turbine engine after shut-off. For instance, large volumes of air may be forced through the engine to remove the heat. However, forcing large volumes of air through the engine may require a substantial amount of energy, which may not be desirable.

In accordance with one or more aspects of this disclosure, one or more components of a gas-turbine engine may be rotated after the gas-turbine engine is shut off. For instance, an energy storage system, such as one or more battery cells, may provide electrical energy to an electrical motor that provides rotational mechanical energy to rotate a rotor. In some examples, the rotation of the rotor upon the engine being shut off may be called "barring". In some examples, the function of rotating the rotor upon the engine being shut off may be called a "barring function".

In some examples, starting a gas-turbine engine is typically performed by an air turbine starter with air provided by either a ground cart, an Auxiliary Power Unit (APU), or cross bleeding from an operating engine. Additionally, on a twin-engine aircraft, the Federal Aviation Administration (FAA) requires the ability to perform an inflight restart with both engines off. An APU may be non-essential, meaning that the aircraft can fly without the APU being functional. With a disabled or inactive APU, there may be external assistance available from other equipment to support an inflight restart. With low compression gas-turbine engines, this assistance may come from the windmilling effect whereby the forward flight of the aircraft provides energy to spin the gas-turbine engine shaft(s).

As engines become more fuel-efficient, overall pressure ratio on the compressor may be increased, with most or all of this compression being on a single shaft. This may lead to higher required starting torques. Accordingly, windmilling energy (e.g., at reasonable airspeeds) may no longer be sufficient to restart the engine inflight. Accordingly, supplemental assistance may be required.

In some examples, the present disclosure is directed to using supplemental energy from an energy storage system to provide power for an electrical start system to start one or more engines, such as during an inflight restart. In some examples, the electrical start system in the present disclosure may combine the ability to use supplemental energy from an energy storage system with power provided by the propulsion system to perform an inflight restart.

As noted above, some examples of the present disclosure relate to gas-turbine engine that include an HP spool assembly and one or more lower-pressure spool assemblies (e.g., such as a low-pressure spool assembly or intermediate spool assembly). For ease of illustration, examples of the disclosure are described primarily with regard to dual spool gas-turbine engines including a HP spool assembly, a low-pressure spool assembly (e.g., including a low-pressure propulsor and/or a low-pressure compressor), and a generator that generates power from rotation of the low-pressure shaft. However, the techniques described herein may also be applied to intermediate-pressure spool assemblies with such a generator in addition to, or as an alternative to, the low-pressure spool assemblies. In some examples, an alternative generator or an additional generator may generate power from rotation of the high-pressure shaft. In some examples, a generator may generate power from rotation of the low-pressure shaft and/or rotation of the high-pressure shaft.

FIG. 1 is a conceptual diagram illustrating an example vehicle in accordance with an example of the present disclosure. In the example of FIG. 1, the vehicle includes an aircraft 10. In other examples, the vehicle may include any type of gas-turbine engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. The vehicle may be manned, semiautonomous, or autonomous.

Aircraft 10 includes a fuselage 12, wings 14, an empennage 16, two gas-turbine engine systems 18A and 18B (collectively, "gas-turbine engines 18") as main propulsion engines. In other examples, aircraft 10 may include a single gas-turbine engine 18 or a plurality of propulsion systems 18. As illustrated in FIG. 1, aircraft 10 is a twin-engine turbofan aircraft. In some examples, aircraft 10 may be any fixed-wing aircraft, including turbofan aircraft, turbojet aircraft, and turboprop aircraft. In some examples, aircraft 10 may be a rotary-wing aircraft or a combination rotary-wing/fixed-wing aircraft (e.g., VTOL, STOL, etc.). Aircraft 10 may employ any number of wings 14. Empennage 16 may employ a single or multiple flight control surfaces. Gas-turbine engines 18 may be the main propulsion systems of aircraft 10. Aircraft may also have more than two engines such as three or four engines or may have a single engine.

In accordance with some examples of the disclosure, one or both of gas-turbine engine systems 18A and 18B may include an HP spool, one or more lower pressure (LP) spools (e.g., a single low-pressure spool or a low-pressure spool and one or more intermediate pressure (IP) spools), and a generator coupled to a rotating shaft of a lower pressure (LP) spool. The systems may be configured such that the generator generates power from the rotation of the LP shaft, which results in a torque applied to the LP shaft. In some examples, when a gas-turbine engine 18A, 18B is shut off, various components of the gas-turbine engine 18A, 18B may retain heat that resulted from operation of the gas-turbine engine 18A, 18B. As the components cool, the components may slightly change size. For certain components, such as rotors or other components with tight clearances, uneven cooling may be undesirable. For instance, uneven cooling may result in the components seizing, which may frustrate re-start of the gas-turbine engine 18A, 18B until additional cooling has occurred. In accordance with some examples of this disclosure, an electric motor may rotate one or more components of a gas-turbine engine 18A, 18B after the gas-turbine engine 18A, 18B has been shut off.

Figure 2A:
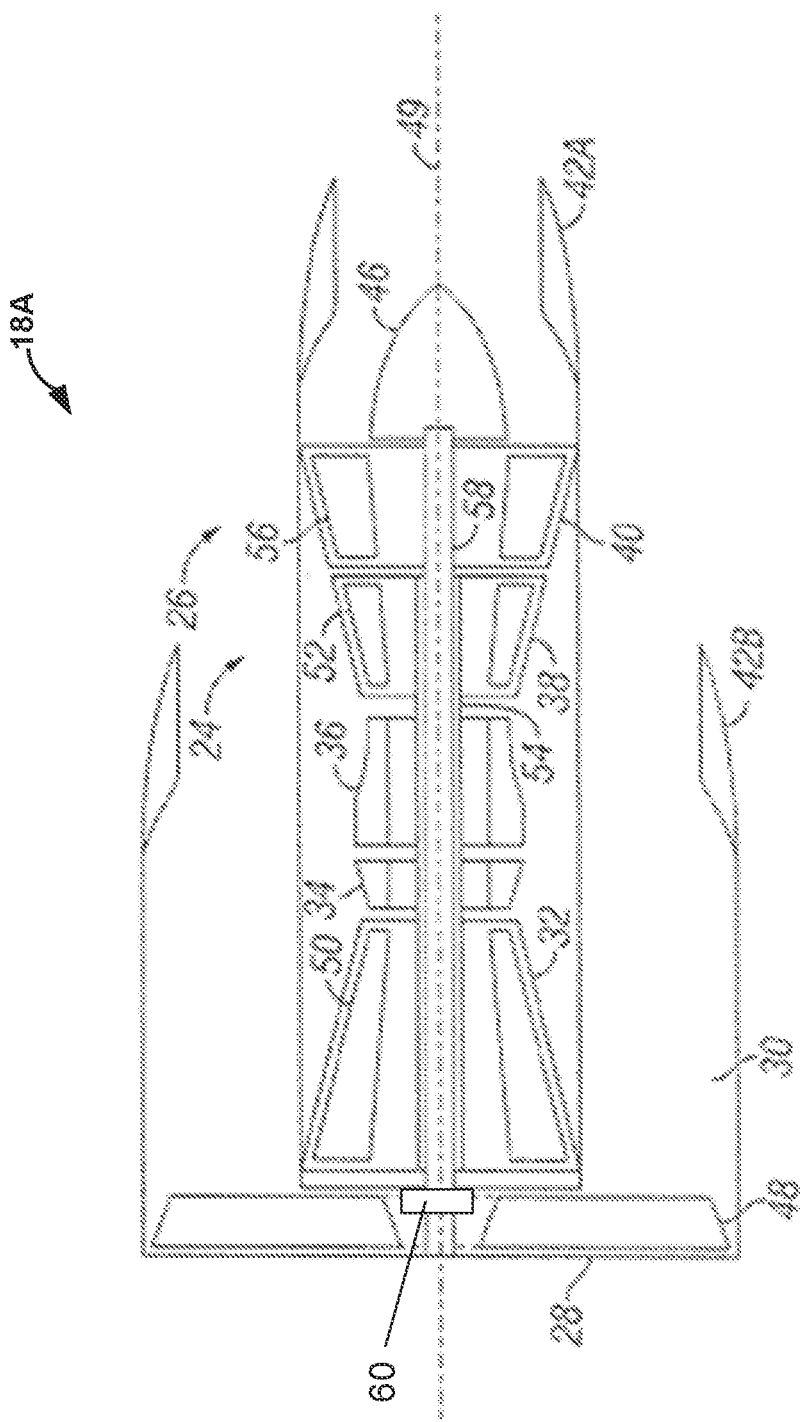
FIGS. 2A-2B are conceptual diagrams illustrating various examples of gas-turbine engine systems in accordance with examples of the present disclosure.

FIG. 2A is a conceptual and schematic diagram illustrating gas-turbine engine system 18A in accordance with an example of the present disclosure. Although described herein as with respect to an aircraft propulsion system, in other examples, gas-turbine engine 18A may be a propulsion system for providing propulsive thrust to any type of gas-turbine engine powered vehicle, as discussed above, or configured to provide power any suitable nonvehicle system including gas-turbine engine 18A. Engine 18B may be the same or similar to engine 18A in FIG. 1.

Engine 18A may be a primary propulsion engine that provides thrust for flight operations of aircraft 10. In the example of FIG. 2A, engine 18A is a two-spool engine having a high-pressure (HP) spool (rotor) 24 and a low-pressure spool (rotor) 26. In other embodiments, engine 18A may include three or more spools, e.g., may include an IP spool and/or other spools and/or partial spools, e.g., on-axis or off-axis compressor and/or turbine stages (i.e., stages that rotate about an axis that is the same or different than that of the primary spool(s)). In one form, engine 18A is a turbofan engine. In other embodiments, engine 18A may be any other type of gas-turbine engine, such as a turboprop engine, a turboshaft engine, a propfan engine, a turbojet engine or a hybrid or combined cycle engine. As a turbofan engine, low-pressure spool 26 is operative to drive a propulsor 28 in the form of a fan, which may be referred to as a fan system. As a turboprop engine, low-pressure spool 26 powers a propulsor 28 in the form of a propeller system (not shown), e.g., via a reduction gearbox (not shown). In other embodiments, propulsor 28 may take other forms, such as one or more helicopter rotors or tilt-wing aircraft rotors, for example, powered by one or more engines 18A in the form of one or more turboshaft engines.

In some examples, engine 18A includes, in addition to propulsor 28, a bypass duct 30, a high-pressure (HP) compressor 32, a diffuser 34, a combustor 36, a high-pressure (HP) turbine 38, a low-pressure turbine 40, a nozzle 42A, a nozzle 42B, and a tailcone 46, which are generally disposed about and/or rotate about an engine centerline 49. In other embodiments, there may be, for example, an intermediate pressure spool having an intermediate pressure turbine or other turbomachinery components, such as those mentioned above. In some examples, engine centerline 49 is the axis of rotation of propulsor 28, HP compressor 32, HP turbine 38 and turbine 40. In other embodiments, one or more of propulsor 28, HP compressor 32, HP turbine 38 and turbine 40 may rotate about a different axis of rotation.

In the depicted example, engine 18A core flow is discharged through nozzle 42A, and the bypass flow from propulsor 28 is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and HP compressor 32 are in fluid communication with propulsor 28. Nozzle 42B is in fluid communication with bypass duct 30. Diffuser 34 is in fluid communication with HP compressor 32. Combustor 36 is fluidly disposed between HP compressor 32 and HP turbine 38. Turbine 40 is fluidly disposed between HP turbine 38 and nozzle 42A. In one form, combustor 36 includes a combustion liner (not shown) that contains a continuous combustion process. In other embodiments, combustor 36 may take other forms, and may be, for example, a wave rotor combustion system, a rotary valve combustion system, a pulse detonation combustion system, a continuous detonation combustion system and/or a slinger combustion system, and may employ deflagration and/or detonation combustion processes.

Propulsor 28 may include a fan rotor system 48 driven by low-pressure spool 26. In various examples, fan rotor system 48 may include one or more rotors that are powered by turbine 40. In various embodiments, propulsor 28 may include one or more fan vane stages (not shown in FIG. 2A) that cooperate with fan blades (not shown) of fan rotor system 48 to compress air and to generate a thrust-producing flow. Bypass duct 30 is operative to transmit a bypass flow generated by propulsor 28 around the core of engine 18A. HP compressor 32 includes a compressor rotor system 50. In various examples, compressor rotor system 50 includes one or more rotors (not shown) that are powered by HP turbine 38. HP compressor 32 also includes a plurality of compressor vane stages (not shown in FIG. 2A) that cooperate with compressor blades (not shown) of compressor rotor system 50 to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages.

HP turbine 38 includes a turbine rotor system 52. In various embodiments, turbine rotor system 52 includes one or more rotors having turbine blades (not shown) operative to extract power from the hot gases flowing through HP turbine 38 (not shown), to drive compressor rotor system 50. HP turbine 38 also includes a plurality of turbine vane stages (not shown) that cooperate with the turbine blades of turbine rotor system 52 to extract power from the hot gases discharged by combustor 36. In one form, the turbine vane stages are stationary. In other embodiments, one or more vane stages may be replaced with one or more counter-rotating blade stages. Turbine rotor system 52 is drivingly coupled to compressor rotor system 50 via a shafting system 54 (also referred to as high-pressure (HP) shaft 54). Turbine 40 includes a turbine rotor system 56. In various embodiments, turbine rotor system 56 includes one or more rotors having turbine blades (not shown) operative to drive fan rotor system 48. Turbine 40 may also include a plurality of turbine vane stages (not shown in FIG. 2A) that cooperate with the turbine blades of turbine rotor system 56 to extract power from the hot gases discharged by HP turbine 38. In one form, the turbine vane stages are stationary. In other embodiments, one or more vane stages may be replaced with one or more counter-rotating blade stages. Turbine rotor system 56 is drivingly coupled to fan rotor system 48 via shafting system 58 (also referred to as low-pressure shaft 58). In various embodiments, shafting systems 54 and 58 include a plurality of shafts that may rotate at the same or different speeds and directions for driving fan rotor system 48 rotor(s) and compressor rotor system 50 rotor(s). For ease of description, shafting system 54 of HP spool 24 is described primarily as HP shaft 54 but is it recognized that system 54 is not limited to a single shaft. Likewise, shafting system 58 of low-pressure spool 26 is described primarily as low-pressure shaft 58 but is it recognized that system 58 is not limited to a single shaft. Turbine 40 is operative to discharge the engine 18A core flow to nozzle 42A.

During normal operation of gas-turbine engine 18A, air is drawn into the inlet of propulsor 28 and pressurized. Some of the air pressurized by propulsor 28 is directed into HP compressor 32 as core flow, and some of the pressurized air is directed into bypass duct 30 as bypass flow. HP compressor 32 further pressurizes the portion of the air received therein from propulsor 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive HP compressor 32 and propulsor 28 via respective HP shaft 54 and low-pressure shaft 58. The hot gases exiting turbine 40 are discharged through nozzle system 42A, and provide a component of the thrust output by engine 18A.

As shown in FIG. 2A, engine 18A includes generator 60. In the illustrated example, generator 60 is positioned between fan system 48 and HP compressor 32 along centerline 49. Generator 60 may include any suitable type and/or arrangement of an electrical machine such as an electro-mechanical generator that operates in the manner described herein, e.g., by generating power from the rotation of low-pressure shaft 58, with the amount of power being generated being adjusted in some circumstances based on the operation of engine 18A. For example, the amount of power being generated by generator 60 may be increased in combination with a decrease in thrust by engine 18A, e.g., to temporarily increase the torque applied on low-pressure shaft 58 when the thrust generated by engine 18A is initially reduced.

In some examples, generator 60 may be positioned in front of the nose cone or spinner of engine 18A. In other examples, rather than being embedded and positioned coaxially with low-pressure shaft 58, generator 60 may be mounted on an externally mounted gearbox which is powered by a shaft driven from the LP rotor (or by either LP rotor or IP rotor in a three-spool engine).

In some examples, generator 60 may be an electrical machine that is configured to be selectively operated as an electric generator or an electric motor. Example of suitable motor-generators 60 may include one or more of the examples of the motor-generator and motor generator assemblies disclosed within U.S. patent application Ser. Nos. 15/590,623; 15/590,606; 15/590,581; and Ser. No. 15/590,554, filed May 9, 2017 and the example electrical machines describes in U.S. patent application Ser. No. 15/135,167 filed Dec. 19, 2013. The entire content of these applications are incorporated by reference herein. In some examples, generator 60 may be selectively operated to extract and/or provide power to the low-pressure shaft 58. For example, generator 60 may be configured for selective operation between a generation mode to generate electrical power from rotation of the low-pressure turbine 40 and in a drive or motor mode to receive electrical power for applying rotational force to the low-pressure shaft 58. In some examples, generator 60 may be a permanent magnet alternator. However, in some examples of the disclosure, generator 60 is an electrical machine that operates in a generator mode but not a motor mode.

In the example of FIG. 2A as well as the other examples turbine engine systems described herein, generator 60 may be an embedded electrical machine in that the stator and rotor of electrical machine core are positioned coaxially with low-pressure shaft 58. The stator of generator 60 may be fixed against rotation relative to the low-pressure shaft 58 and a rotor may be coupled to the low-pressure shaft 58 for rotation therewith. The rotor may be attached to a mount of the low-pressure shaft 58 positioned axially between shaft bearings of the low-pressure shaft 58. The stator may include a number of stator windings positioned radially outward of the rotor, such that each stator winding is arranged in electromagnetic communication with the rotor 44. In other examples, generator 60 may include a stator and rotor positioned non-coaxially, e.g., where the rotor of generator 60 is rotationally coupled to low-pressure shaft 58 via one or more other shafts and suitable gearing.

Figure 2B:
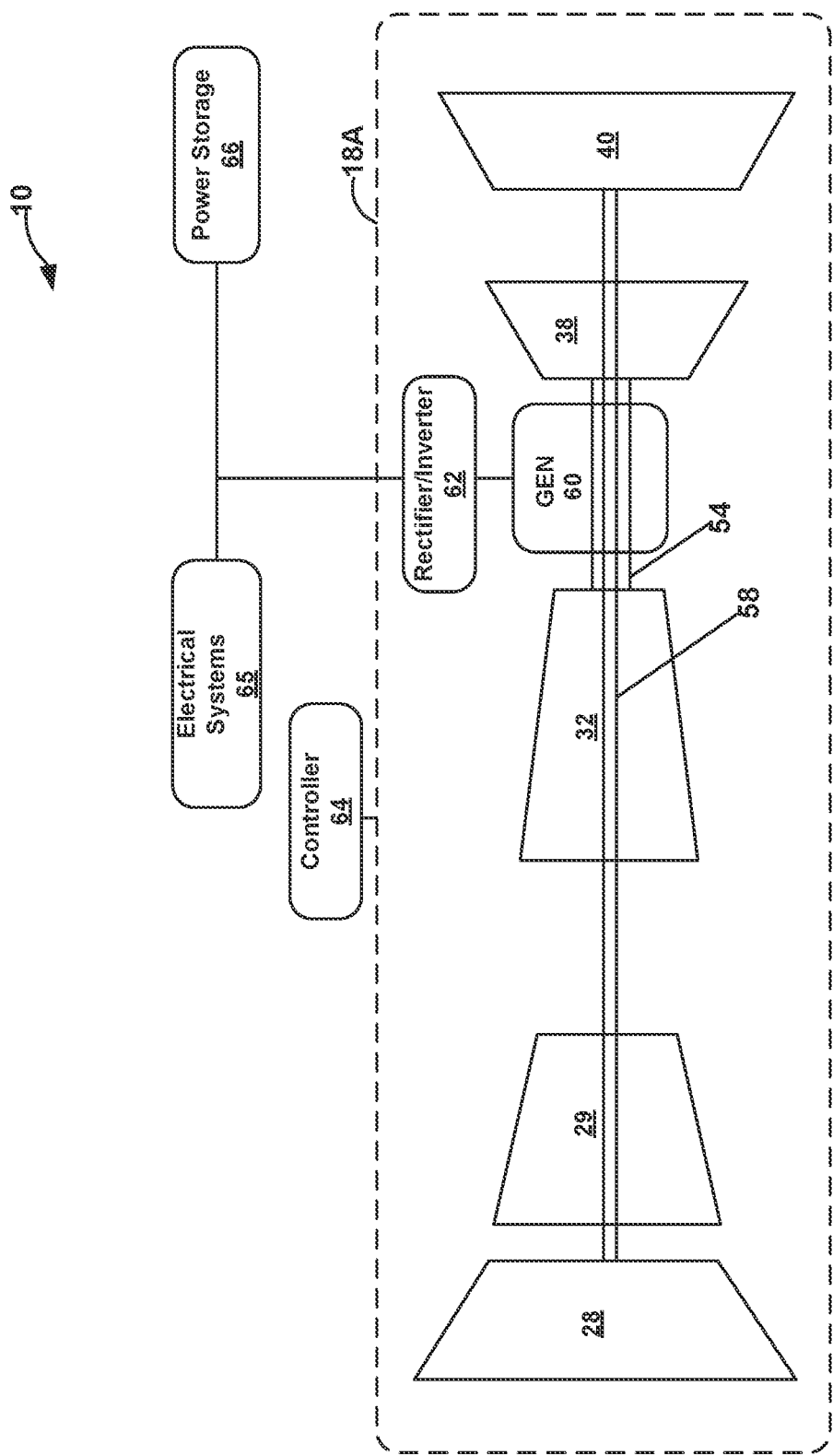

FIG. 2B is another example of a schematic functional diagram illustrating an additional configuration and components of engine system 18A of FIGS. 1 and 2A, and like features are similarly numbered. As noted above, engine system 18A may be a gas turbofan system. Engine 18A may include propulsor rotor system 28 that is rotationally coupled to low-pressure turbine 40 by low-pressure shaft 58, and HP compressor 32 rotationally coupled to HP turbine 38 by HP shaft 54. The speed of HP shaft 54 driving the HP compressor 32 may be different from that of the speed of shaft 58 driving the propulsor rotor system 28. The combination of HP compressor 32, HP turbine 38 and HP shaft 54 may be referred to as the HP spool assembly 24 or HP spool 24.

Engine 18A of FIG. 2B includes low-pressure compressor 29. Low-pressure compressor 29 is coupled to rotationally coupled to low-pressure turbine 40 by low-pressure shaft 58. In some examples, low-pressure compressor 29 may be referred to as a booster. In some examples, low-pressure compressor 29 may be similar to that of HP compressor 32 and may include a compressor rotor system (not shown in detail in FIG. 2B). In various examples, the compressor rotor system includes one or more rotors (not shown) that are powered by low-pressure turbine 40. Low-pressure compressor 29 may also include a plurality of compressor vane stages (not shown in FIG. 2B) that cooperate with compressor blades (not shown) of the compressor rotor system to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages. In operation, low-pressure compressor 29 may operate to increase the pressure of the intake air, which is then further increase in pressure by HP compressor 32.

The combination of propulsor system 28, low-pressure compressor 29, low-pressure turbine 40 and low-pressure shaft 58 may be referred to as the low-pressure spool assembly 26 or low-pressure spool 26. In some examples, as shown in FIG. 2B, engine 18A of FIG. 2B may include generator 60, which is operably coupled to one or more of HP shaft 54 or LP shaft 58, e.g., in an embedded (co-axial) with HP shaft 54 and/or LP shaft 58 or non-co-axial.

Engine system 18A may also include a rectifier/inverter 62. In some examples, electrical systems 65 and power storage device 66 may be part of the aircraft system 10. In some examples, system 10 may also include controller 64. In some examples, controller 64 may include control circuitry for the control of the engine systems and may control the rectifier 62. In some examples, controller 64 may include one or a combination of controllers as part of a control system that controls the operation of engine 18A and/or other components of system 10. For example, controller 64 may represent more than one controller, wherein the more than one controller includes one or more electronic engine controllers. The electronic engine controllers may be part of the engine but may be physically located on the aircraft. In some examples, one of the individual controllers of controller 64 may control the electrical loads and battery in aircraft 10 as part of system 10. As illustrated, all or a portion of controller 64 may be located on aircraft 10. However, there may be some configuration where an engine controller may be mounted on engine 18A.

In some examples, electrical system 65 and power storage system 66, which are devices that can absorb relatively large amounts of power, use power supplied by generator 60. As described herein, the amount of electrical load applied by electrical system 65 and/or power storage system 66 on generator 60 may be varied to vary the amount of torque load applied by generator 60 on low-pressure shaft 58, e.g., to decrease the rotational speed of low-pressure shaft 58 over a shorter period of time in combination with the reduction in thrust by engine 18A. The generator output voltage may be controlled by the rectifier 62 that may control the power input to power storage 66 on a DC bus. If the rectifier 62 is powering a DC bus with multiple power sources (not shown) then it may also control the generator power to the electrical system 65.

Controller 64 may be configured to control the components of engine 18A and/or aircraft 10 individually and selectively such that engine 18A and system 10 more generally implement the techniques described herein. Controller 64 may comprise any suitable arrangement of hardware, software, firmware, or any combination thereof, to perform the techniques attributed to controller 64 herein. Examples of controller 64 include any of one or more microprocessors, digital signal processors (DSPs), application specific integrated circuits (ASICs), field programmable gate arrays (FPGAs), processing circuitry, or any other equivalent integrated or discrete logic circuitry, as well as any combinations of such components. When controller 64 includes software or firmware, controller 64 further includes any necessary hardware for storing and executing the software or firmware, such as one or more processors or processing units. In some examples, all or portions of controller 64 may be embodied in a full authority digital engine control (FADEC) including an electronic engine controller (EEC) or engine control unit (ECU) and related accessories that control one or more aspects of the operation of engine system 18A.

In general, a processing unit may include one or more microprocessors, DSPs, ASICs, FPGAs, or any other equivalent integrated or discrete logic circuitry, as well as any combinations of such components. Although not shown in FIG. 2B, controller 64 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 64 (e.g., may be external to a package in which controller 64 is housed).

Although controller 64 is generally described as being the primary unit for controlling each of the engine components of system 18A for performing the techniques described herein, in some examples, the individual components of system 18A may include additional functionality for performing some or all the operations described below with respect to controller 64. For example, a combination of one or more of HP compressor 32, turbines 38, 40, propulsor 28, low-pressure compressor 29, generator 60, rectifier/inverter 62, and the like may include components for controlling the operation of system 18A in the manner described herein. As described herein, generator 60, is configured to generate power from the rotation of shaft 58, e.g., as driven by turbine 40. The electrical energy generated by generator 60 in a generator mode may be used to provide operational power to one or more electrically operated systems 65 of vehicle 10 (FIG. 1). In some examples, generator 60 may be configured to generate continuous aircraft or transient system power also defined by the desired end user application. Example electrical systems 65 that may be powered by generator 60 include hydraulic and/or pneumatic drive systems, environmental control systems, communications systems, directed energy systems, radar systems and component cooling systems. Electrical systems 65 may be any system having electrical components requiring power to operate. When operation power is supplied by a generator such as generator 60, electrical system 65 may apply an electrical load on the generator in order for electrical system 65 to operate in the desired manner.

Additionally, or alternatively, all or some of the power generated by generator 60 may be stored by power storage device 66. In such an example, rectifier/inverter 62, under the control of controller 64 may increase its output voltage to input all or a portion of the power generated by generator 60 as direct current to power storage device 66 for storage of the power. Power storage device 66 may be any suitable device such as one or more suitable batteries or capacitors. Engine 18A may utilize the power stored in power storage device at times when the power generated by generator 60 is relatively low. Power storage device 66 may apply (e.g., selectively) an electrical load on generator 60 to recharge the power storage device (e.g., battery). The electrical load applied by power storage device 66 on generator 60 may increase the torque on LP shaft 58.

In some examples, an engine system may include two generators, one generator operatively coupled to the HP rotor/HP shaft 54 and the other generator to the lower-pressure rotor/shaft 58.

In some examples of the gas-turbine engine system, one or more gas-turbine engines may not include a center sump to increase efficiency, improve secondary flow and reduce weight of the gas-turbine engine system. However, when one or more of the gas-turbine engines are shut off, heat produced by the gas-turbine engine(s) may warp a rotor of the gas-turbine engine(s) such that the rotor may contact a compressor of the engine(s) and/or lock-up inside a compressor of the engine. In addition, uneven heating may cause the tight clearances between shafts and top clearances on airfoils to close. When a rotor is becomes locked-up, it may take prolonged time at rest to cool the rotor sufficiently to allow for clearance to be restored. Such a delay may be undesirable as it may delay subsequent operation of the gas-turbine engine and associated vehicle.

In accordance with one or more aspects of this disclosure, an electrical machine may rotate a shaft of a gas-turbine engine responsive to the gas-turbine engine being shut off. For instance, an energy storage system, such as one or more batteries, may provide electrical energy to the electrical machine, which converts the electrical energy into rotational mechanical energy that in turn rotates the shaft of the gas-turbine engine. In some examples, the rotation of the rotor upon the engine being shut off may be called barring.

In some examples, the electrical machine that rotates the shaft (e.g., that performs the barring) may perform one or more other functions of the gas-turbine engine. For instance, during normal operation of the gas-turbine engine, the electrical machine may generate electrical power that is used to operate one or more ignitors of the gas-turbine engine. In some examples, the electrical machine may be a permanent magnet alternator (PMA). Windings on the electrical machine that perform the barring operation may be the same windings that generate the ignitor energy or may be different windings. When the windings are different, the windings for the barring function and the windings for the ignitors may be on a common shaft (e.g., a same shaft). Using the same windings for both operations may provide advantages, such as weight savings. Using different windings may also provide advantages, such as manufacturing simplicity (e.g., reduction in slot count).

Figure 3A:
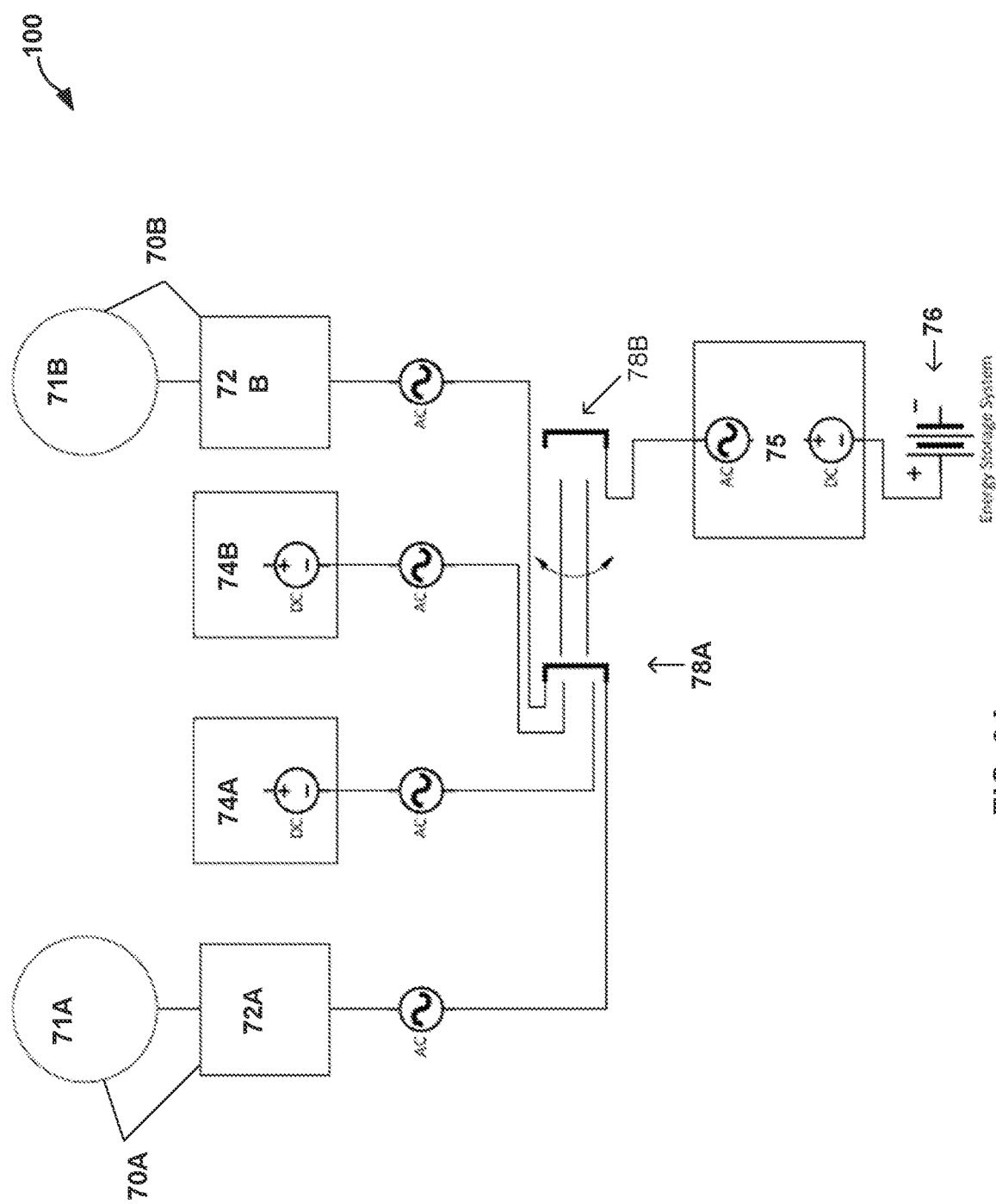
FIGS. 3A-3B are conceptual diagrams illustrating an example system for barring a rotor in accordance with examples of the present disclosure.

FIG. 3A is a schematic functional diagram illustrating an example system 100 for powering a shaft to cause a rotor to rotate to bar the rotor using the energy received from the energy storage system, in accordance with examples of the disclosure. In some examples, electrical machine 78 may be similar to generator 60, power electronics system 75 may be similar to electrical system 65, and controller 64 may be similar to electronic engine controllers 74A, 74B. In some examples, energy storage system 76 may be in addition to power storage device 66. In some examples, electrical machine 78 may include two electrical machines 78A, 78B that are distinct from each other. In some examples, electrical machine 78A may provide electrical energy to ignitor modules 70A, 70B, and engine controllers 74A, 74B while electrical machine 78B may be separately electrically coupled to energy storage system 76 and power electronics system 75. While electrical machine 78 while be reference in the singular below, electrical machine 78 may include two electrical machines 78A, 78B, such as in the examples discussed above.

In some examples, system 100 may include one or more ignitor modules 70A, 70B configured to ignite/maintain ignition of one or more gas-turbine engines (not shown in FIG. 3A). In some examples, an ignitor module 70A may include an ignitor 71A and an exciter box 72A. In some examples, the system may include one or more electronic engine controllers 74A, 74B, to control one or more gas-turbine engines (e.g., in a redundant/fault-tolerant arrangement). In some examples, the system may further include an electrical machine 78 electrically connected to the one or more ignitor modules 70A, 70B, and electrically connected to the one or more electronic engine controllers 74A, 74B (e.g., configured to supply electrical energy to). In some examples, electrical machine 78 may be a permanent magnet alternator. In some examples, electrical machine 78 may be configured to provide electrical energy to the one or more ignitor modules 70A, 70B, to ignite/maintain ignition the one or more engines. In some examples, electrical machine 78 may be configured to generate electrical energy used by the one or more electronic engine controllers 74A, 74B. In some examples, electrical machine 78 may be configured to provide electrical energy to the one or more ignitor modules 70A, 70B and the one or more ignitor modules 70A, 70B, simultaneously. In some examples, the electronic engine controllers 74A, 74B may use the electrical energy received from the electrical machine 78 to control the one or more gas-turbine engines. In some examples, one or more electric engine controllers 74A, 74B may be configured to shut off each of the one or more gas-turbine engines (e.g., responsive to pilot commands).

In some examples, electrical machine 78 may be configured to selectively operate as a motor, such as a permanent magnet alternator (PMA). For example, electrical machine 78 may be configured to receive energy from energy storage system 76 via the power electronics system 75 and cause the rotor (e.g., HP spool) to rotate to bar the rotor using the energy received from the energy storage system 76.

In some examples, the system 100 may further include an energy storage system 76 and a power electronics system 75 electrically connected to the energy storage system 76 and configured to receive electrical energy from the energy storage system 76. In some examples, the energy storage system 76 may comprise one or more battery cells.

In some examples, energy storage system 76 may generate direct current (DC) electricity to output to power electronics system 75. In some examples, power electronics system 75 may include a DC/alternating current (AC) converter to convert DC electricity received from the energy storage system to AC electricity. In some examples, power electronics system 75 may be configured to output the converted AC electricity to cause the electrical machine 78 to rotate the rotor.

In some examples, energy storage system 76 and power electronics system 75 may configured to have electrical energy flow bi-directionally between energy storage system 76 and power electronics system 75. In some examples, power electronics system 75 may be configured to provide electrical energy to energy storage system 76 when the one or more gas-turbine engines are operating and/or electrical machine 78 is turned on. In some examples, energy storage system 76 may be configured to store electrical energy received from power electronics system 75 when the one or more gas-turbine engines are operating and/or electrical machine 78 is turned on. In some examples, since the power electronics system 75 uses energy from the energy storage system 76 to cause the electrical machine 78 to rotate the rotor and the energy storage system 76 is charged when the one or more gas-turbine engines are operating, the power used to rotate the rotor may be at least partially obtained from electrical energy generated by the one or more gas-turbine engines. This may help improve energy efficiency of system 100.

Figure 3B:
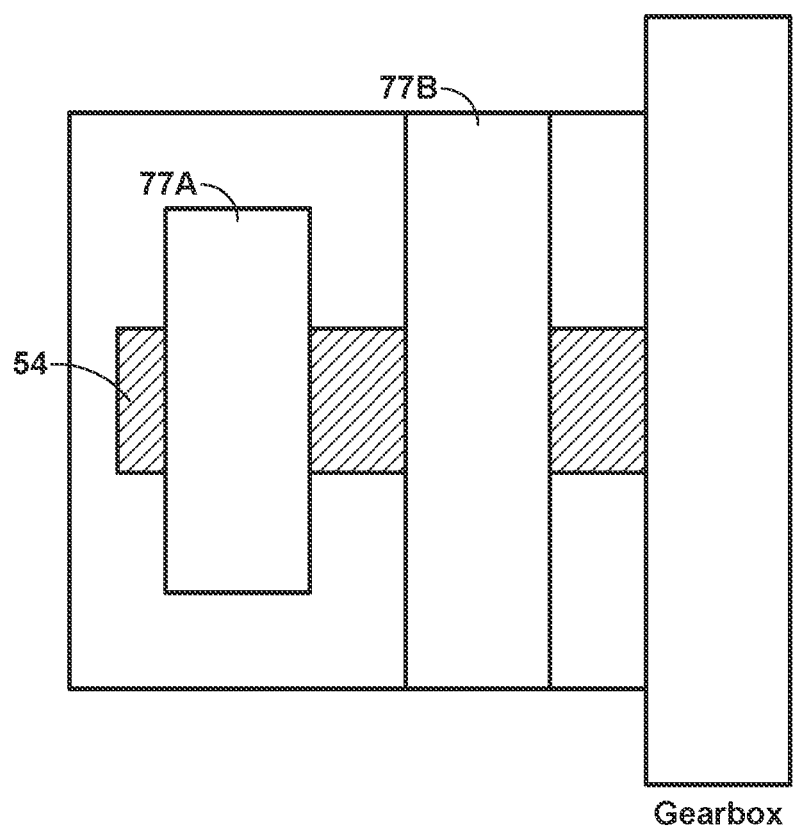

In some examples, the electrical machine 78 may further include a shaft, such as an HP shaft 54 as shown in FIG. 2A, coupled to the one or more electronic engine controllers 74A, 74B via first windings 77a. In some examples, as shown in FIG. 3B, the shaft 54 may be coupled to the power electronics system 75 via second windings 77b, which may be electrically isolated from the first windings. In this example, while the functions of the electrical machine 78, such as a permanent magnet alternator, and the functions of the power electronics system 75 may be on the same shaft 54, they may be electrically isolated from each other.

Figure 4A:
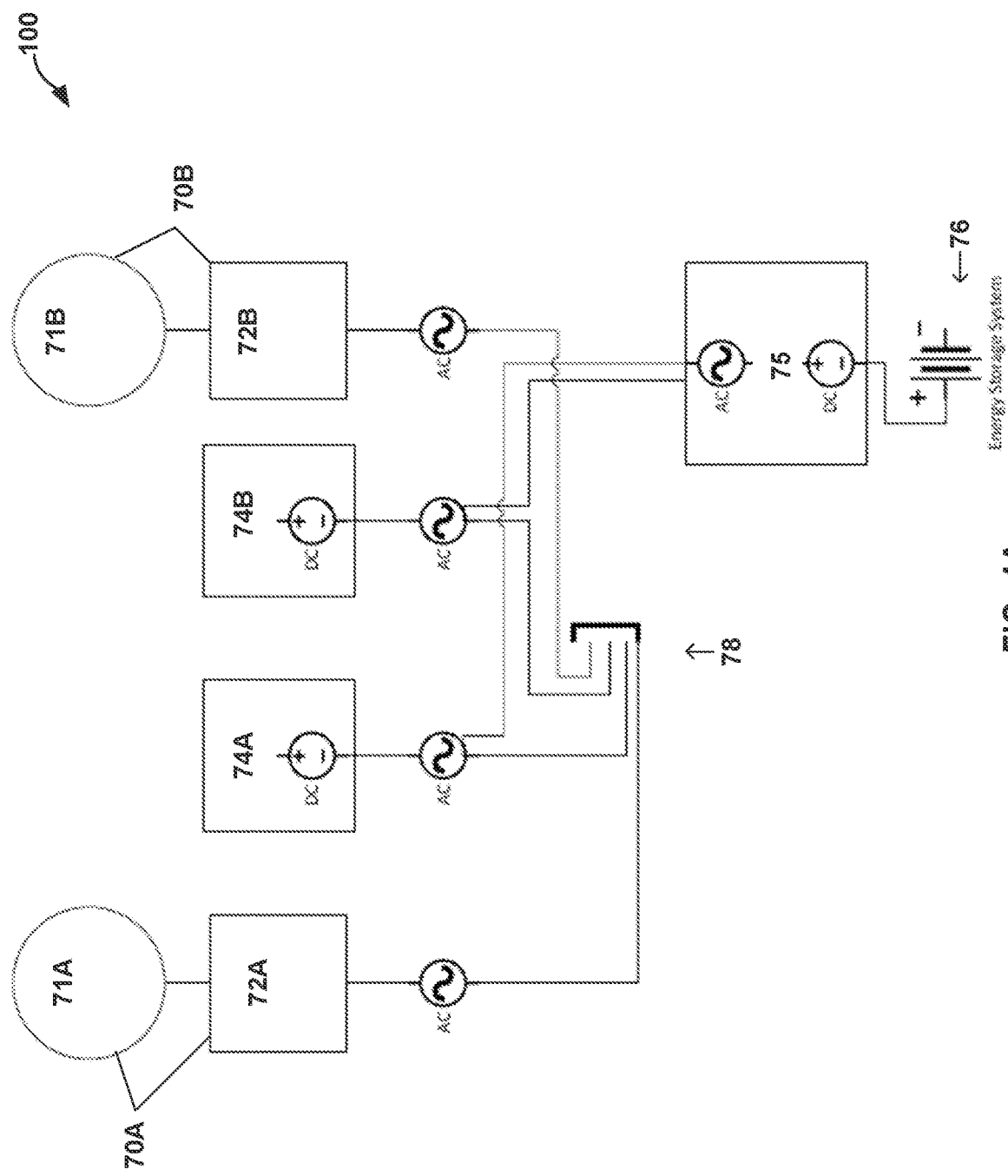
FIGS. 4A-4B are conceptual diagrams illustrating an example system for barring a rotor in accordance with examples of the present disclosure.
Figure 4B:
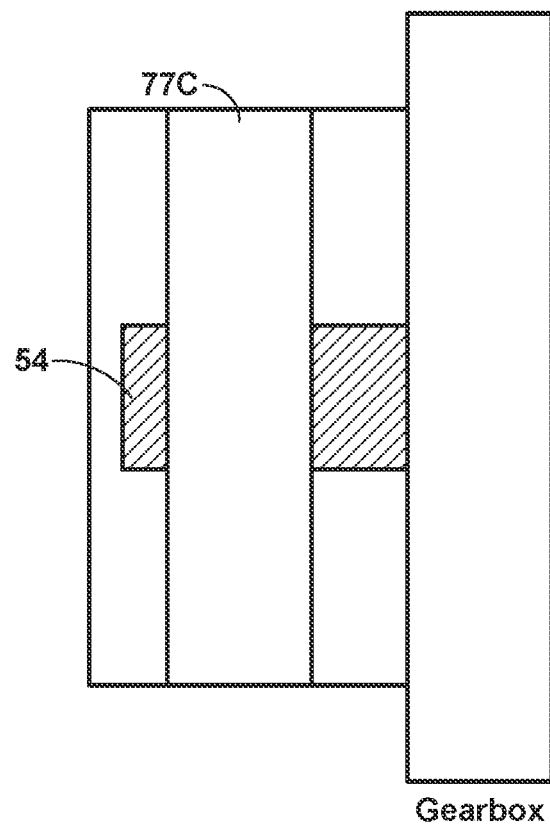

In some examples, such as shown in FIGS. 4A and 4B, the one or more electronic engine controllers 74A, 74B, and the power electronics system 75 may be coupled to shaft 54 (not shown in FIG. 4A) via the same windings 77c. In this example, the functions of the electrical machine 78, such as a permanent magnet alternator, and the functions of the power electronics system 75 may be integrated into the same machine.

In some examples, in response to each of the one or more gas-turbine engines being shut off, the power electronics system 75 may cause the electrical machine 78 to rotate a rotor, such as rotor 32, using the energy received from the energy storage system 76. In some examples, the rotation of the rotor upon the engine being shut off may be called barring.

Power electronics system 75 may cause the electrical machine 78 to rotate at a speed that is fast enough to prevent seizing of the rotor, but low enough to avoid expending unnecessary energy. In some examples, power electronics system 75 may be configured to cause the electrical machine 78 to rotate the rotor at a speed of less than 1000 revolutions per minute. In some examples, power electronics system 75 may be configured to cause the electrical machine 78 to rotate the rotor at a speed of less than 500 revolutions per minute. In some examples, power electronics system 75 may be configured to cause the electrical machine 78 to rotate the rotor at a speed of less than 200 revolutions per minute. In some examples, power electronics system 75 may be configured to cause the electrical machine 78 to rotate the rotor at a speed of less than 100 revolutions per minute. In some examples, power electronics system 75 may be configured to cause the electrical machine 78 to rotate the rotor at a speed of less than 50 revolutions per minute. In some examples, power electronics system 65 may be configured to cause the electrical machine 78 to rotate the rotor at a speed of less than 25 revolutions per minute. In some examples, power electronics system 75 may be configured to cause the electrical machine 78 to rotate the rotor at a speed of less than 10 revolutions per minute. In some examples, power electronics system 75 may be configured to cause the electrical machine 78 to rotate the rotor at a speed of less than 5 revolutions per minute.

In some examples, power electronics system 75 may be configured to stop/cease causing the electrical machine 78 to rotate the rotor based on one or more criterion. For instance, power electronics system 75 may cease causing the electrical machine 78 to rotate the rotor in response to one or more of determining an amount of time after the one or more gas-turbine engines being shut off is above a time threshold, determining an engine maintenance switch is activated, and/or determining the power stored in energy storage system 76 falls below an energy threshold. In some examples, power electronics system 75 may be configured to include a time threshold in which power electronics system 75 stops causing the electrical machine 78 to rotate the rotor. The time threshold may be preset. In some examples, the time threshold may be based on one or more of temperature of a rotor, an outside temperature, speed the rotor rotates during operation of the barring function, and/or other various features. In other examples, the point at which power electronics 75 ceases causing the electrical machine 78 to rotate the rotor may not be based on a temperature (e.g., a temperature of the rotor).

In some examples, a switch, such as an engine maintenance switch, when turned on, may instruct power electronics system 75 to stop powering shaft to rotate the rotor. In some examples, a user, such as a pilot or maintenance person, may turn on the engine maintenance switch. In some examples, an engine maintenance switch may be used when maintenance needs to be done on the engine and a person needs to access one or more engines. In some examples, electrical energy may flow to rotate the rotor regardless of one or more other switches (e.g., regardless of a battery master switch or other such switch that controls a ship's main battery).

In some examples, power electronics system 75 may cause the electrical machine 78 to stop causing the rotor to rotate when determining power stored in energy storage system 76 is below an energy threshold. In some examples, an energy threshold may be an amount in which energy storage system 76 no longer has enough remaining power to power a rotor to rotate. In some examples, an energy threshold may be an amount in which energy storage system 76 needs to maintain to not reduce a lifetime of energy storage system 76 and/or one or more battery cells in energy storage system 76.

In accordance with the system 100 described above, a barring function may be triggered by a loss of power to the electronic engine controllers 74A, 74B, such as when the gas-turbine engine(s) are shut off, and the barring function may be powered by the energy storage system 76. This enables the rotor to rotate while the gas-turbine engine(s) and/or electrical machine 78 are shut off. This may improve energy efficiency. In addition, since a barring function may be triggered by one of the gas-turbine engine(s) and/or the electrical machine 78 being shut off, the system 100 described above simplifies initiating the barring function and may reduce occurrences when the barring function is not initiated as needed. This may reduce occurrences of a rotor locking-up and/or rotor bow problems in which tight clearances between shafts and tip clearances close. When a rotor locks-up, a prolonged amount of time may be needed to cool the rotor sufficiently to allow for clearance to be restored. This may delay the ability of a plane to be able to fly. Accordingly, the system 100 described above may reduce occurrences of flight delays caused by rotor lock-up and/or lack of clearance between shafts and tip.

In some examples, in response to the barring function being energized after shutdown of the one or more engines, once a rotor speed slows to below a torque of a barring motor, the speed of the rotor may stabilize.

In some examples, electrical machine 78 may be a permanent magnet alternator (PMA). In some examples, when a gas-turbine engine is started, one or more ignitor modules 70A, 70B, may engage and drive a high-pressure spool to light-off and to idle. At this time, PMA 78 is performing its functions as an electrical machine, such as providing power to one or more of the ignitor modules 70A, 70B and/or electronic engine controllers 74A, 74B, and there is no need for barring at this time. In addition, when one or more gas-turbine engines are on, an energy storage system 76 may either be re-charging or be electrically isolated during this time.

In some examples, upon shutdown of the gas-turbine engine(s), a barring function may be triggered (e.g., by a loss of power to the electronic engine controllers 74A, 74B from PMA 78). In some examples, the barring function may be initiated by a user or other triggers as well. In response to the barring function being triggered, energy storage system 76 provides power to power electronics system 75. In some examples, power electronics system 75 may provide power, using the energy received from the energy storage system, to cause PMA 78 to rotate the rotor. For example, power electronics system 75 may provide power to PMA 78 using the same windings that PMA 78 powers electronic engine controllers 74A, 74B and/or ignitor modules 70A, 70B. In some examples, power electronics system 75 may power a barring function causing the electrical machine 78 to rotate a rotor using different windings than the windings used by PMA 78 to power electronic engine controllers 74A, 74B and/or ignitor modules 70A, 70B. For example, the powering of the barring function may be electrically isolated from electronic engine controllers 74A, 74B and/or ignitor modules 70A, 70B.

Figure 5:
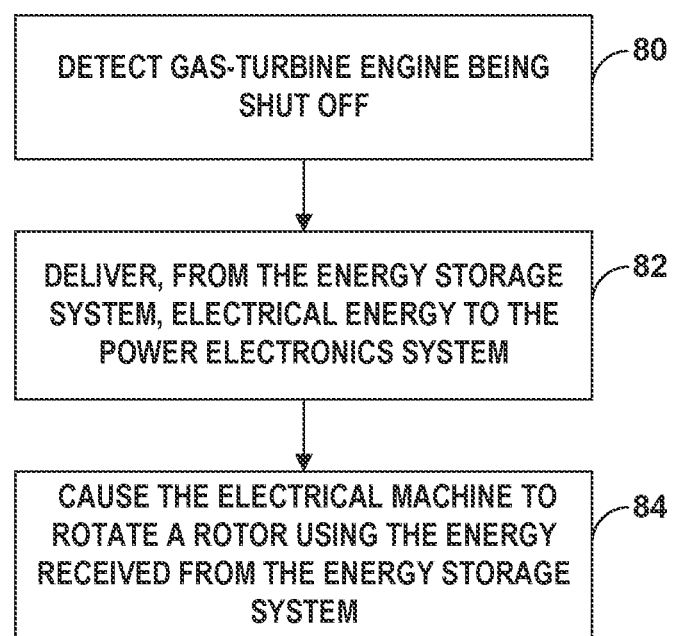
FIG. 5 is a flow diagram illustrating another example technique for barring a rotor in accordance with examples of the disclosure.

As shown in FIG. 5, power electronics system 75 detects the gas-turbine engine being shut off (80). As one example, power electronics system 75 may determine that fuel flow to the gas-turbine engine has been cut off. As another example, power electronics system 75 may monitor voltage from barring windings (e.g., windings of PMA 78 used to rotate the rotor during barring), and determine that the gas-turbine has been shut off based on the voltage dropping below a threshold.

In response to detecting the gas-turbine engine being shut off, power electronics system 75 may cause energy storage system 76 to deliver electrical energy to power electronics system 75. Thus, energy storage system 76 may delver electrical energy to power electronics system 75 in response to the gas-turbine engine being shut off (82). In some examples, power electronics system 75 may further selectively initiate barring based on other signals, such as squat switches (e.g., a signal indicating the aircraft is on the ground). In response to the electrical energy being delivered by energy storage system 76 to power electronics system 75, power electronic system 75 causes the electrical machine 78 to rotate a rotor using the energy received from energy storage system 76 (84).

As discussed above, starting a gas-turbine engine is typically performed by an air turbine starter with air provided by either a ground cart, an APU, or cross bleeding from an operating engine. Additionally, there is a requirement by the FAA that a twin-engine aircraft be able to perform an inflight restart with both engines off. An airframer may choose to make the APU non-essential, meaning that the aircraft may fly without the APU being functional (e.g., the APU may not be an on minimum equipment list (MEL)). An air turbine starter is a component in a pneumatic system with the pneumatic system also encompassing a starter air valve, appropriate sensing and control instrumentation, ducting, and a load compressor or bleed system from the APU. With a disabled or inactive APU, there may be no external assistance available from other equipment to support an inflight restart. In some examples, with low compression gas-turbine engines, this assistance may come from the windmilling effect whereby the forward flight of the aircraft provides energy to spin the gas-turbine engine shaft(s).

In some examples, to increase fuel efficiency of gas-turbine engines, overall pressure ratio on the compressor may be increased. In some examples, all of this compression may be on a single shaft (e.g., a gas-turbine engine may include a single high-pressure spool) and which may lead to higher required starting torques. In some examples, windmilling energy may no longer be sufficient to restart the gas-turbine engine inflight and therefore, supplemental assistance is required. In accordance with one or more aspects of this disclosure, an electrical starting system may provide supplemental assistance that may be required to restart the gas-turbine engines inflight. For instance, electrical energy from an energy storage system may be combined with electrical energy from an electrical machine to power one or more starters during an inflight restart to restart one or more of the gas-turbine engines. Accordingly, sufficient power may be provided to restart one or more gas-turbine engines inflight.

Figure 6:
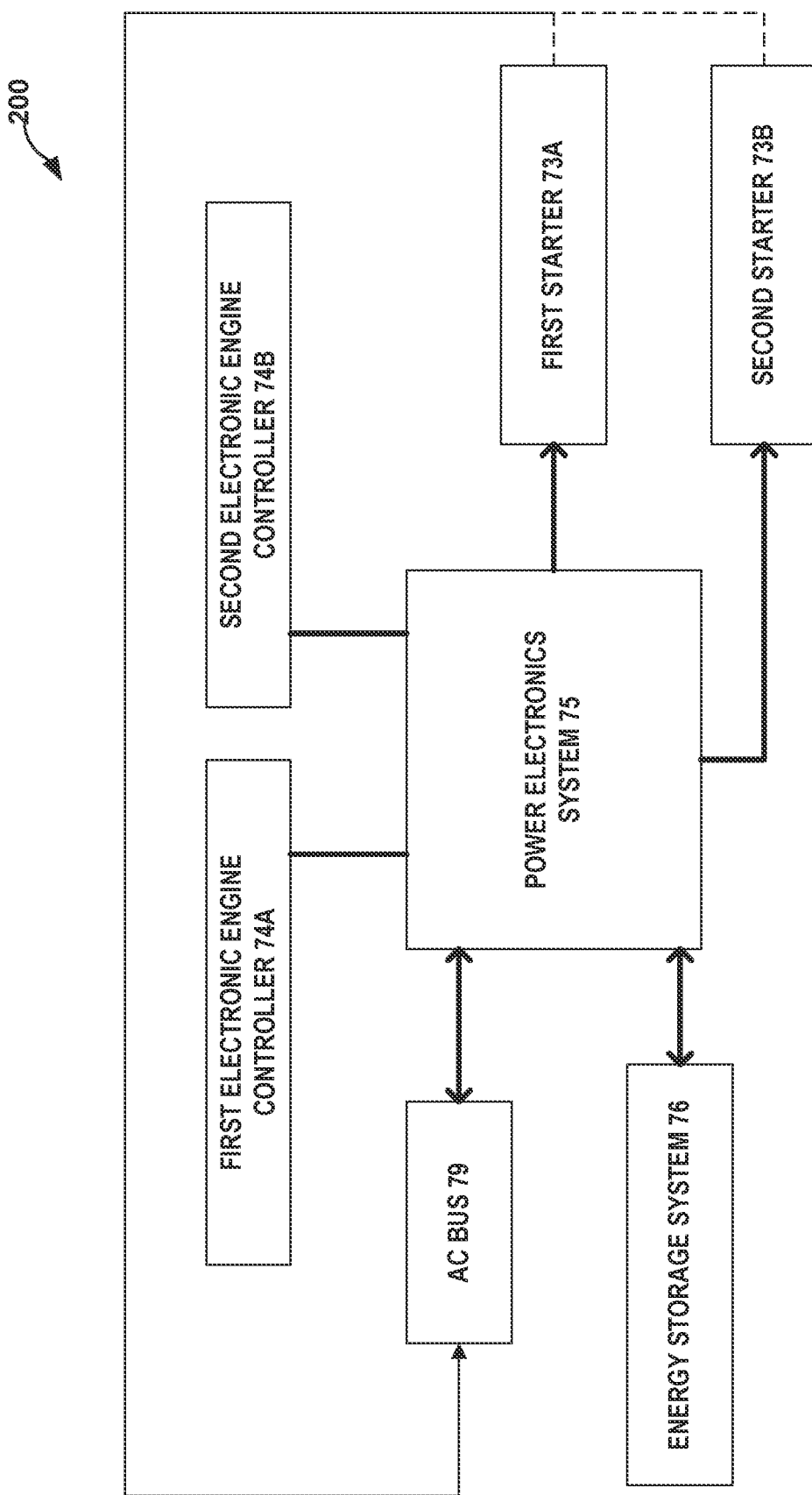
FIG. 6 is a conceptual diagram illustrating an example system for starting one or more engines in accordance with an example of the present disclosure.

FIG. 6 is a schematic functional diagram illustrating an example system 200 for starting one or more gas-turbine engines, including starting one or more gas-turbine engines during an inflight restart. In some examples, as described herein, electrical starting system 200 may use supplemental energy with propulsion system provided power to power one or more starters during an inflight restart to restart one or more of the gas-turbine engines. In some examples, electrical starting system 200 may power one or more starters during an inflight restart to restart one or more of the gas-turbine engines.

In some examples, an electrical starting system 200 may include a power electronics system 75, one or more starters 73A, 73B, one or more electronic engine controllers 74A, 74B, an alternating current (AC) bus 79, and an energy storage system 76.

In some examples, one or more starters 73A, 73B may be electrically connected to the power electronics system 75 and configured to start one or more gas-turbine engines. One or more electronic engine controllers 74A, 64B may be electrically connected to the power electronics system 200 and configured to control the one or more gas-turbine engines. AC bus 79 may be electrically connected to the power electronics system 75 and configured to provide electrical energy to the power electronics system 75. Energy storage system 76 may be electrically connected to the power electronics system 75 and configured to provide electrical energy to the power electronics system 75. In some examples, power electronics system 75 may be configured to deliver power to the one or more starters 73A, 73B to start the one or more gas-turbine engines using electrical energy from the energy storage system 76 and using electrical energy from the electrical machine 78.

In some examples, power electronics system 75 may include one or more inverters, one or more rectifiers and/or one or more converters. In some examples, the one or more starters 73A, 73B may be a 3-phase electric starter. In some examples, the one or more rectifiers and the one or more converters may supply an inverter that drives a 3-phase electric starter. The power electronics system 75 may be configured to convert DC electricity to AC electricity and/or convert AC electricity to DC electricity. In some examples, power electronics system 75 may supply power to the one or more starters 73A, 73B one at a time (e.g., during non-overlapping time periods). In some examples, power electronics system 75 may supply power to the one or more starters 73A, 73B simultaneously.

In some examples, the power electronics system 75 may be configured to receive AC power from the AC bus 79, receive DC power from the energy storage system 76, and convert the received DC power from the energy storage system 76 to AC power. In some examples, AC power may be put back on the AC bus. In some examples, the power electronics system 75 may be further configured to rectify the received AC power from the AC bus 79 to DC power, then combine that rectified DC power with the DC power received from energy storage system 76, and then invert the combined DC power to AC power to generate a combined AC power. In some examples, the power electronics system 75 may be further configured to output the combined AC power to the one or more starters 71A, 71B to start one or more of the gas-turbine engine(s).

AC bus 79 may be an AC electrical bus supplied by (e.g., energized by) various power sources. As one example, AC bus 79 may receive power from electrical machine 78 (e.g., when a corresponding gas-turbine engine is operating). As another example, AC bus 79 may receive power from an inverter that sources DC power from a DC electrical energy source that is different than the energy storage system 76. In some examples, the DC electrical energy source may be one or both of a main ship's battery of the aircraft; and/or an external power connection. The DC electrical energy source may, in some examples, be a 28 volt DC electrical energy source. An operating voltage level of AC bus 79 may be between 80 and 150 volts. As one specific example, the operating voltage level of AC bus 79 may be 115 volts.

In some examples, energy storage system may include one or more battery cells. In some examples, energy storage system 76 may include a voltage between 12 volts DC and 1080 volts DC. In some examples, energy storage system 76 may include a voltage between 50 volts DC and 500 volts DC. In some examples, energy storage system 76 may include a voltage between 150 volts DC and 400 volts DC. In some examples, energy storage system 76 may include a voltage between 225 volts DC and 378 volts DC. In some examples, energy storage system 76 may include a voltage between 240 volts DC and 300 volts DC. In some examples, energy storage system 76 may include a voltage of 270 volts DC.

In some examples, a cold day ground start may require the largest amounts of power and may subsequently dictate a size of the electrical machine (starter), cables, and thermal management system. However, energy storage system 76 may be sized for in-air restarts if there is supplemental energy available for cold day ground starts, such as that provided by a ground cart or an APU.

In some examples, electrical energy may flow bi-directionally between electrical machine 78 and power electronics system 75. In some examples, the electrical energy that flows between electrical machine 78 and power electronics system 75 may be AC power. In some examples, electrical energy may flow between electrical machine 78 and power electronics system 75 between 0.01 kilowatt (kW) and 500 kW. In some examples, electrical energy may flow between electrical machine 78 and power electronics system 75 between 0.1 kW and 200 kW. In some examples, electrical energy may flow between electrical machine 78 and power electronics system 75 between 1 kW and 100 kW. In some examples, electrical energy may flow between electrical machine 78 and power electronics system 75 between 5 kW and 75 kW. In some examples, electrical energy may flow between electrical machine 60 and power electronics system 75 between 10 kW and 50 kW. In some examples, electrical energy may flow between electrical machine 78 and power electronics system 75 between 20 kW and 40 kW. In some examples, electrical energy may flow between electrical machine 78 and power electronics system 75 at 28 kW.

In some examples, electrical energy may flow bi-directionally between energy storage system 76 and the power electronics system 75. In some examples, electrical energy that flows between energy storage system 76 and power electronics system 75 may be DC power. In some examples, when one or more gas-turbine engines are in operation, energy storage system 76 may be charged from energy received from electrical machine 78 via power electronics system 75. In some examples, electrical energy may flow between energy storage system 76 and power electronics system 75 between 0.01 kW and 500 kW. n some examples, electrical energy may flow between energy storage system 76 and power electronics system 75 between 0.1 kW and 400 kW. In some examples, electrical energy may flow between energy storage system 76 and power electronics system 75 between 1 kW and 300 kW. In some examples, electrical energy may flow between energy storage system 76 and power electronics system 75 between 10 kW and 250 kW. In some examples, electrical energy may flow between energy storage system 76 and power electronics system 75 between 40 kW and 200 kW. In some examples, electrical energy may flow between energy storage system 66 and power electronics system 75 between 50 kW and 100 kW. In some examples, electrical energy may flow between energy storage system 76 and power electronics system 75 at 79 kW.

In some examples, electrical energy may flow unidirectionally from power electronics 75 system to the one or more starters 70A, 70B. In some examples, the electrical energy that flows from power electronics system 75 to one or more starters 70A, 70B may be AC power. In some examples, power electronics system 75 may convert DC electrical energy received from the energy storage system 76 to AC energy and combine the converted energy with the AC energy received from the electrical machine 78 to then be output to the one of starters 70A, 70B to start one or more gas-turbine engines. In some examples, electrical energy may flow from power electronics system 75 to one or more starters 70A, 70B between 1 kW and 400 kW. In some examples, electrical energy may flow from power electronics system 75 to one or more starters 70A, 70B between 20 kW and 300 kW. In some examples, electrical energy may flow from power electronics system 75 to one or more starters 70A, 70B between 50 kW and 200 kW. In some examples, electrical energy may flow from power electronics system 75 to one or more starters 70A, 70B between 75 kW and 150 kW. In some examples, electrical energy may flow from power electronics system 75 to one or more starters 70A, 70B at 107 kW.

In some examples, electronic engine controller 74A may include one or more controllers (not shown) and may control one particular engine of the gas-turbine engines. In some examples, electronic engine controller 74B may include one or more controllers (not shown) and may be control one particular engine of the gas-turbine engines. In some examples, electronic engine controller 74A may control a different engine than electronic engine controller 74B. In some examples, electronic engine controller 74A and engine controller 74B may control the same engine.

Due to the weight impact of electric start system 200, a thermal management system may be self-contained to minimize any additional burden on the airframe, such as the addition of heat exchangers and their increased drag. In some examples, power electronics system 75 may include a closed loop liquid coolant system including an integrated electrical pump plus tank. In some examples, energy storage system 76 may be at least partially coated in at least one of paraffin or phase-change wax. In some examples, one or more starters 73A, 73B may include features to pump air into the motor and out.

In some examples, electric start system may be thermally isolated, such as not having any heat exchangers to outside air. In some examples, this may simplify operation and integration.

In some examples, in response to each of the one or more gas-turbine engines being shut off for a period of time greater than a time threshold, power electronics system 75 may be configured to cause electrical machine 78 to rotate a rotor using energy received from the energy storage system 76. In some examples, energy storage system 76, as shown in FIG. 6, may also be used to bar a rotor, as was discussed in examples above in reference to FIGS. 3-4.

Figure 7:
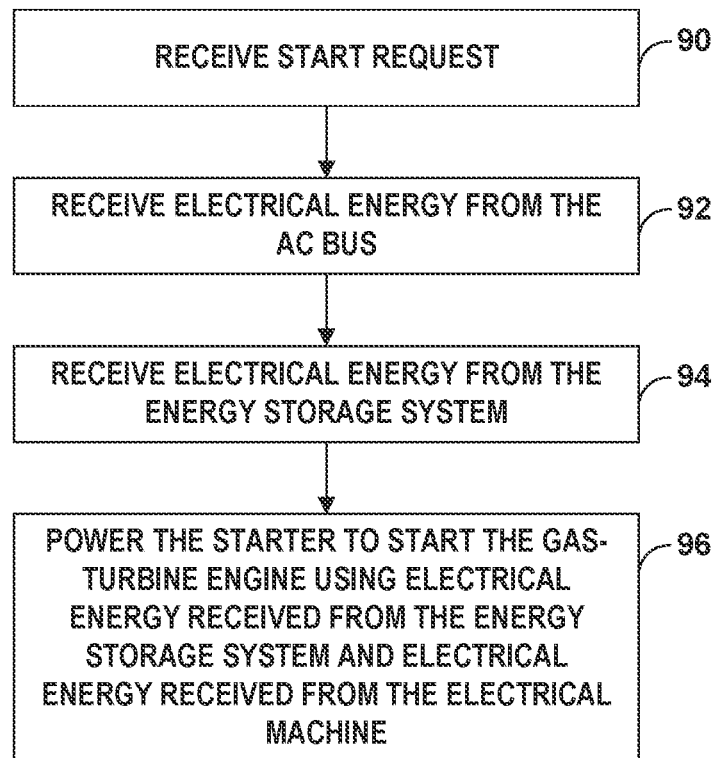
FIG. 7 is a flow diagram illustrating an example technique for starting one or more engines in accordance with examples of the disclosure.

As shown in FIG. 7, power electronics system 75 may receive a start request (90). For instance, power electronics system 75 may receive a start request provided by a pilot of the aircraft. Power electronics system 75 may receive electrical energy from AC bus 79 (92). Power electronics system 75 may receive electrical energy from energy storage system 76 (94). In response to receiving the start request, power electronics system 75 may power the starter 73A, 73B to start the gas-turbine engine using electrical energy received from energy storage system 76 and using electrical energy received from the electrical machine 78 (96).

In some examples, power electronics system 75 may receive AC power from the electrical machine 78, receive DC power from the energy storage system 76, convert the received DC power from the energy storage system 76 to AC power, combine the received AC power from the electrical machine 78 with the converted AC power to generate a combined AC power, and output the combined AC power to the starter 70A, 70B to start the gas-turbine engine.

In some examples, energy storage system 76 may receive electrical energy from electrical machine 78 via power electronics system 75 to charge energy storage system 76 when the gas-turbine engine is on.

The following examples may illustrate one or more aspects of the disclosure:

Example 1A: A system includes an electrical machine electrically configured to generate electrical energy used by one or more components of a gas-turbine engine; an energy storage system; and a controller electrically connected to the energy storage system and configured to receive electrical energy from the energy storage system, wherein, in response to the gas-turbine engine being shut off, the controller is configured to cause the electrical machine to rotate a rotor of the gas-turbine engine using the energy received from the energy storage system.

Example 2A: The system of example 1A, wherein the electrical machine is a permanent magnet alternator (PMA).

Example 3A: The system of any of examples 1A and 2A, wherein the electrical machine includes: a shaft mechanically coupled to the rotor; first windings configured to supply, during operation of the gas-turbine engine, electrical energy to the one or more components of the gas-turbine engine; and second windings configured to cause the shaft to rotate the rotor using power sourced from the energy storage system.

Example 4A: The system of any of examples 1A through 3A, wherein the electrical machine includes: a shaft mechanically coupled to the rotor; common windings configured to: supply, during operation of the gas-turbine engine, electrical energy to the one or more components of the gas-turbine engine; and cause the shaft to rotate the rotor using power sourced from the energy storage system.

Example 5A: The system of any of examples 1A through 4A, wherein the energy storage system includes one or more battery cells configured to generate direct current (DC) electricity to output to the power electronics system.

Example 6A: The system of example 5A, wherein the controller includes a DC/alternating current (AC) converter configured to convert DC electricity received from the energy storage system to AC electricity to output to power the rotor to rotate.

Example 7A: The system of any of examples 1A through 6A, wherein the controller is configured to cause the electrical machine to rotate the rotor at a speed of less than 100 revolutions per minute.

Example 8A: The system of example 7A, wherein the controller is configured to cause the electrical machine to rotate the rotor at a speed of less than 10 revolutions per minute.

Example 9A: The system of any of examples 1A through 8A, wherein the controller is configured to cease causing the electrical machine to rotate the rotor in response to one or more of: an amount of time after the gas-turbine engine being shut off crossing a time threshold; an engine maintenance switch being activated; or the power stored in the energy storage system falling below an energy threshold.

Example 10A: The system of any of examples 1A through 9A, wherein the one or more components of the gas-turbine engine include one or more of: one or more ignitor modules; and one or more electronic engine controllers (EECs).

Example 11A: The system of any of examples 1A through 10A, wherein the gas-turbine comprises a low-pressure spool and a high-pressure spool.

Example 12A: The system of example 11A, wherein the rotor is the high-pressure spool.

Example 13A: The system of any of examples 1A through 12A, wherein the gas-turbine engine comprises a turbo-prop engine configured to propel an aircraft.

Example 14A: The system of example 13A, wherein the gas-turbine engine does not include a center sump.

Example 15A: The system of any of examples 1A through 14A, wherein the controller is configured to charge the energy storage system using power generated by the electric machine during operation of the gas-turbine operation.

Example 16A: A method includes detecting, by a controller, shut down of a gas-turbine engine of an aircraft; and responsive to detecting the shut down of the gas-turbine engine, causing, by the controller, an electrical machine to rotate a rotor of the gas-turbine engine using electrical energy sourced from an electrical energy storage system of the aircraft.

Example 17A: The method of example 16A, wherein causing the electrical machine to rotate the rotor comprises: causing the electrical machine to rotate the rotor at a speed of less than 100 revolutions per minute.

Example 18A: The method of any of examples 16A and 17A, wherein detecting shut down of the gas-turbine engine comprises: determining that fuel flow to the gas-turbine engine has been shut off.

Example 19A: The method of any of examples 16A through 18A, wherein the method further comprises: stopping, by power electronics system, the electrical machine causing the rotor to rotate in response to one or more of: determining an amount of time after the gas-turbine engine being shut off is above a time threshold; determining an engine maintenance switch is activated; or determining the power stored in the energy storage system falls below an energy threshold.

Example 20A: The method of any of examples 14A through 19A, wherein the electrical machine is a permanent magnet alternator (PMA), the method further includes supplying, during operation of the gas-turbine engine, electrical energy generated by the PMA to one or more ignitors of the gas-turbine engine.

Example 1B: A system includes a power electronics system; a starter electrically connected to the power electronics system and configured to start a gas-turbine engine of an aircraft; and an energy storage system electrically connected to the power electronics system and configured to provide direct current (DC) electrical energy to the power electronics system, wherein the power electronics system is configured to deliver alternating current (AC) electrical energy to the starter to start the gas-turbine engine using the DC electrical energy from the energy storage system and AC electrical energy sourced from an AC electrical bus of the aircraft.

Example 2B: The system of example 1B, further includes a DC electrical energy source that is different than the energy storage system; and an inverter configured to energize the AC electrical bus using electrical energy sourced from the DC electrical energy source.

Example 3B: The system of any of examples 1B and 2B, wherein the DC electrical energy source comprises one or more of: a main ship's battery of the aircraft; and an external power connection.

Example 4B: The system of any of examples 1B through 3B, wherein more the power electronics system is configured to source more than half of the AC electrical energy delivered to the starter from the energy storage system.

Example 5B: The system of any of examples 1B through 4B, wherein the starter is a first starter configured to start a first gas-turbine engine of a plurality of gas-turbine engines of the aircraft, the system further includes a second starter electrically connected to the power electronics system and configured to start a second gas-turbine engine of the plurality of gas-turbine engines of the aircraft, wherein the power electronics system is configured to deliver AC electrical energy to the second starter to start the second gas-turbine engine using the DC electrical energy from the energy storage system and the AC electrical bus of the aircraft.

Example 6B: The system of example 5B, wherein the power electronics system is configured to deliver, during flight of the aircraft and when the plurality of gas-turbine engines are shut down, AC electrical energy to the second starter to start the second gas-turbine engine using the DC electrical energy from the energy storage system.

Example 7B: The system of any of examples 1B through 6B, further includes a self-contained thermal management system configured to absorb heat generated by one or more of the energy storage system and the power electronics system.

Example 8B: The system of example 7B, wherein the self-contained thermal management system comprises a closed loop glycol system configured to absorb heat generated by the power electronics system.

Example 9B: The system of any of examples 7B and 8B, wherein the self-contained thermal management system comprises at least one of paraffin or phase-change wax configured to absorb heat generated by the energy storage system.

Example 10B: The system of any of examples 1B through 9B, wherein the DC electrical energy received from the energy storage system has a voltage between 225 volts and 378 volts, and wherein the AC electrical energy received from the AC electrical bus has a voltage between 60 volts and 180 volts.

Example 11B: The system of any of examples 1B through 10B, wherein the gas-turbine engine comprises a turbo-prop engine configured to propel the aircraft.

Example 12B: The system of example 11B, wherein the gas-turbine engine comprises a single high-pressure spool.

Example 13B: The system of example 12B, further includes an electrical machine electrically configured to generate electrical energy used by one or more components of the gas-turbine engine, wherein the power electronics system is configured to, responsive to shut down of the gas-turbine engine, to cause the electrical machine to rotate a rotor of the gas-turbine engine using the energy received from the energy storage system.

Example 14B: A method includes receiving, by a power electronics system of an aircraft; direct current (DC) electrical energy from an energy storage system of the aircraft; receiving, by the power electronics system, alternating current (AC) electrical energy from an AC electrical bus of the aircraft; generating, by the power electronics system and from the DC electrical energy received from the energy storage system and the AC electrical energy received from the AC electrical bus, combined AC electrical energy; outputting, by the power electronics system and to a starter of a gas-turbine engine of the aircraft, the combined AC electrical energy; and starting, by the starter and using the combined AC electrical energy, the gas-turbine engine.

Example 15B: The method of example 14B, wherein the starter is a first starter configured to start a first gas-turbine engine of a plurality of gas-turbine engines of the aircraft, the method further includes outputting, by the power electronics system and to a second starter of a second gas-turbine engine of the aircraft, the combined AC electrical energy; and starting, by the second starter and using the combined AC electrical energy, the second gas-turbine engine.

Example 16B: The method of any of examples 14B and 15B, further includes generating, by the power electronics system and during flight of the aircraft when the plurality of gas-turbine engines are shut down, mid-air restart AC electrical energy from the DC electrical energy received from the energy storage system; outputting, by the power electronics system and to the starter of the first gas-turbine engine of, the mid-air restart AC electrical energy; and mid-air restarting, by the first starter and using the mid-air restart AC electrical energy, the first gas-turbine engine.

Example 17B: The method of example 16B, wherein the mid-air restart AC electrical energy includes a lesser amount of power than the combined AC electrical energy.

Example 18B: The method of example 17B, wherein the gas-turbine engine comprises a turbo-prop engine configured to propel the aircraft, and wherein the gas-turbine engine comprises a single high-pressure spool.

Example 19B: The method of any of examples 14B through 18B, wherein the gas-turbine engine comprises a turbo-prop engine configured to propel the aircraft, and wherein the gas-turbine engine comprises a single high-pressure spool.

Example 20B: The method of any of examples 14B through 19B, wherein the DC electrical energy includes a first amount of power, wherein the AC electrical energy includes a second amount of power, wherein the combined AC electrical energy includes a combined amount of power that is substantially a sum of the first amount of power and the second amount of power, and wherein the first amount of power is greater than the second amount of power.

Various examples have been described. These and other examples are within the scope of the following examples and claims.

What is claimed is:

1. A system comprising:
    a power electronics system;
    a starter electrically connected to the power electronics system and configured to start a gas-turbine engine of an aircraft;
    an alternating current (AC) electrical bus connected to the power electronics system, the AC electrical bus being supplied power by one or more power sources of the aircraft; and
    an energy storage system electrically connected to the power electronics system and configured to provide direct current (DC) electrical energy to the power electronics system,
    wherein the power electronics system is configured to deliver AC electrical energy to the starter to start the gas-turbine engine using the DC electrical energy from the energy storage system and AC electrical energy sourced from the AC electrical bus of the aircraft.

2. The system of claim 1, further comprising:
    a DC electrical energy source that is different than the energy storage system; and
    an inverter configured to energize the AC electrical bus using electrical energy sourced from the DC electrical energy source.

3. The system of claim 2, wherein the DC electrical energy source comprises one or more of:
    a main ship's battery of the aircraft; and
    an external power connection.

4. The system of claim 1, wherein the power electronics system is configured to source more than half of the AC electrical energy delivered to the starter from the energy storage system.

5. The system of claim 1, wherein the starter is a first starter configured to start a first gas-turbine engine of a plurality of gas-turbine engines of the aircraft, the system further comprising:
    a second starter electrically connected to the power electronics system and configured to start a second gas-turbine engine of the plurality of gas-turbine engines of the aircraft,
    wherein the power electronics system is configured to deliver AC electrical energy to the second starter to start the second gas-turbine engine using the DC electrical energy from the energy storage system and the AC electrical bus of the aircraft.

6. The system of claim 5, wherein the power electronics system is configured to deliver, during flight of the aircraft and when the plurality of gas-turbine engines are shut down, AC electrical energy to the second starter to start the second gas-turbine engine using the DC electrical energy from the energy storage system.

7. The system of claim 1, further comprising:
    a self-contained thermal management system configured to absorb heat generated by one or more of the energy storage system and the power electronics system.

8. The system of claim 7, wherein the self-contained thermal management system comprises at least one of paraffin or phase-change wax configured to absorb heat generated by the energy storage system.

9. The system of claim 1, wherein the DC electrical energy received from the energy storage system has a voltage between 225 volts and 378 volts, and wherein the AC electrical energy received from the AC electrical bus has a voltage between 60 volts and 180 volts.

10. The system of claim 1, wherein the gas-turbine engine comprises a turbo-prop engine configured to propel the aircraft.

11. The system of claim 10, wherein the gas-turbine engine comprises a single high-pressure spool.

12. The system of claim 11, further comprising:
    an electrical machine electrically configured to generate electrical energy used by one or more components of the gas-turbine engine,
    wherein the power electronics system is configured to, responsive to shut down of the gas-turbine engine, to cause the electrical machine to rotate a rotor of the gas-turbine engine using the energy received from the energy storage system.

13. A method comprising:
    receiving, by a power electronics system of an aircraft, direct current (DC) electrical energy from an energy storage system of the aircraft;
    receiving, by the power electronics system, alternating current (AC) electrical energy from an AC electrical bus of the aircraft, the AC electrical bus being supplied power by one or more power sources of the aircraft;
    generating, by the power electronics system and from the DC electrical energy received from the energy storage system and the AC electrical energy received from the AC electrical bus, combined AC electrical energy;
    outputting, by the power electronics system and to a starter of a gas-turbine engine of the aircraft, the combined AC electrical energy; and
    starting, by the starter and using the combined AC electrical energy, the gas-turbine engine.

14. The method of claim 13, wherein the starter is a first starter configured to start a first gas-turbine engine of a plurality of gas-turbine engines of the aircraft, the method further comprising:
    outputting, by the power electronics system and to a second starter of a second gas-turbine engine of the aircraft, the combined AC electrical energy; and
    starting, by the second starter and using the combined AC electrical energy, the second gas-turbine engine.

15. The method of claim 13, further comprising:
    generating, by the power electronics system and during flight of the aircraft when the plurality of gas-turbine engines are shut down, mid-air restart AC electrical energy from the DC electrical energy received from the energy storage system;
    outputting, by the power electronics system and to the starter of the first gas-turbine engine of, the mid-air restart AC electrical energy; and
    mid-air restarting, by the first starter and using the mid-air restart AC electrical energy, the first gas-turbine engine.

16. The method of claim 15, wherein the mid-air restart AC electrical energy includes a lesser amount of power than the combined AC electrical energy.

17. The method of claim 16, wherein the gas-turbine engine comprises a turbo-prop engine configured to propel the aircraft, and wherein the gas-turbine engine comprises a single high-pressure spool.

18. The method of claim 13, wherein the gas-turbine engine comprises a turbo-prop engine configured to propel the aircraft, and wherein the gas-turbine engine comprises a single high-pressure spool.

19. The method of claim 13, wherein the DC electrical energy includes a first amount of power, wherein the AC electrical energy includes a second amount of power, wherein the combined AC electrical energy includes a combined amount of power that is substantially a sum of the first amount of power and the second amount of power, and wherein the first amount of power is greater than the second amount of power.

20. A system comprising:
a power electronics system;
a first starter electrically connected to the power electronics system and configured to start a first gas-turbine engine of an aircraft;
a second starter electrically connected to the power electronics system and configured to start a second gas-turbine engine of the plurality of gas-turbine engines of the aircraft;
an alternating current (AC) bus of the aircraft connected to the power electronics system and configured to provide AC electrical energy to the power electronics system, the AC bus being supplied power by one or more power sources of the aircraft; and
an energy storage system electrically connected to the power electronics system and configured to provide direct current (DC) electrical energy to the power electronics system,
wherein the power electronics system is configured to:
deliver AC electrical energy to the first starter to start the first gas-turbine engine using the DC electrical energy from the energy storage system and the AC electrical energy sourced from the AC electrical bus of the aircraft, and
deliver AC electrical energy to the second starter to start the second gas-turbine engine using the DC electrical energy from the energy storage system and the AC electrical energy sourced from the AC electrical bus of the aircraft.

* * * * *